United States Patent
Su et al.

(10) Patent No.: US 9,323,106 B2
(45) Date of Patent: Apr. 26, 2016

(54) FABRICATING METHOD OF TRANSPARENT LIQUID CRYSTAL DISPLAY

(71) Applicant: Chunghwa Picture Tubes, LTD., Taoyuan (TW)

(72) Inventors: Chun-Wei Su, New Taipei (TW); Jan-Tian Lian, Keelung (TW)

(73) Assignee: Chunghwa Picture Tubes, LTD., Taoyuan (TW)

( * ) Notice: Subject to any disclaimer, the term of this patent is extended or adjusted under 35 U.S.C. 154(b) by 429 days.

(21) Appl. No.: 13/875,285

(22) Filed: May 2, 2013

(65) Prior Publication Data
US 2014/0264982 A1    Sep. 18, 2014

(30) Foreign Application Priority Data
Mar. 15, 2013   (TW) .............................. 102109289 A (51) Int. Cl.
*B29D 11/00*   (2006.01)
*G02F 1/1341*   (2006.01)
*G02F 1/1337*   (2006.01)
*C09K 19/54*   (2006.01)

(52) U.S. Cl.
CPC .... *G02F 1/133788* (2013.01); *G02F 1/133703* (2013.01); *C09K 2019/546* (2013.01); *G02F 2001/133765* (2013.01)

(58) Field of Classification Search
USPC ................................................ 264/1.36, 1.3
See application file for complete search history.

(56) References Cited

U.S. PATENT DOCUMENTS

| | | | | |
|---|---|---|---|---|
| 5,776,364 A | * | 7/1998 | Niiyama ............... | C09K 19/542 252/299.01 |
| 6,452,650 B1 | * | 9/2002 | Nakao ................... | G02F 1/1334 349/86 |
| 2004/0046921 A1 | * | 3/2004 | Momose ............. | G02F 1/13392 349/153 |
| 2005/0264750 A1 | * | 12/2005 | Andoh ................ | G02F 1/13394 349/156 |
| 2009/0018305 A1 | * | 1/2009 | Yoshida ............... | C07D 251/54 528/289 |
| 2010/0208175 A1 | * | 8/2010 | Yasuda ............. | G02F 1/133528 349/96 |

FOREIGN PATENT DOCUMENTS

| | | |
|---|---|---|
| CN | 102876334 | 1/2013 |
| TW | 200804448 | 1/2008 |
| TW | I336017 | 1/2011 |

OTHER PUBLICATIONS

"Office Action of Taiwan Counterpart Application," issued on Dec. 24, 2014, p. 1-p. 7.

* cited by examiner

*Primary Examiner* — Mathieu Vargot
(74) *Attorney, Agent, or Firm* — Jianq Chyun IP Office (57) ABSTRACT

A fabricating method of a transparent liquid crystal display includes the following steps. First, a first substrate and a second substrate are assembled. Then, a liquid crystal composition is injected between the first substrate and the second substrate. The liquid crystal composition includes a plurality of liquid crystal molecules and a polymerizable material, wherein the polymerizable material includes a polyether polyol acrylate monomer and a liquid crystal polymerization initiator. Afterward, an irradiation procedure and a thermal procedure are executed.

7 Claims, 5 Drawing Sheets

FABRICATING METHOD OF TRANSPARENT LIQUID CRYSTAL DISPLAY

CROSS-REFERENCE TO RELATED APPLICATION

This application claims the priority benefit of Taiwan application serial no. 102109289, filed on Mar. 15, 2013. The entirety of the above-mentioned patent application is hereby incorporated by reference herein and made a part of this specification.

BACKGROUND OF THE INVENTION

1. Field of the Invention

The invention relates to a fabricating method of a liquid crystal display and more particularly relates to a fabricating method of a transparent liquid crystal display.

2. Description of Related Art

The current fabrication procedures of transparent liquid crystal displays may be categorized into two types, one of which requires coating of an alignment film and the other does not. For fabrication of the transparent liquid crystal display that requires coating of the alignment film, typically it is necessary to coat and cure an alignment material on the substrate, so as to form the alignment film. Thereafter, a sealant is formed between the top and the bottom substrate, and then a liquid crystal material is filled between the top and the bottom substrates. Next, an irradiation precuring procedure and a roasting procedure are respectively performed on the sealant so as to complete the assembly of the liquid crystal panel.

Moreover, for fabrication of the transparent liquid crystal display that does not require coating of the alignment film (e.g. fabrication of polymer stabilized vertical alignment (PSVA)), although coating of the alignment film is not needed, it is necessary to additionally apply a voltage in combination with an irradiation procedure, such that the polymers can have alignment properties. In other words, the current fabrication of liquid crystal displays generally requires alignment-related procedures.

SUMMARY OF THE INVENTION

The invention provides a fabricating method of a transparent liquid crystal display, which does not require an alignment-related fabrication procedure and achieves quick production.

The invention provides a fabricating method of a transparent liquid crystal display, which includes the following. First, a first substrate and a second substrate are assembled. Then, a liquid crystal composition is injected between the first substrate and the second substrate. The liquid crystal composition includes a plurality of liquid crystal molecules and a polymerizable material, wherein the polymerizable material includes a polyether polyol acrylate monomer and a liquid crystal polymerization initiator. Afterward, an irradiation procedure and a thermal procedure are executed.

In an embodiment of the invention, the liquid crystal polymerization initiator includes a photo-initiator.

In an embodiment of the invention, when the irradiation procedure is performed, a portion of the liquid crystal molecules form a plurality of first polymer liquid crystal cells and a plurality of second polymer liquid crystal cells on surfaces of the first substrate and the second substrate after being irradiated.

In an embodiment of the invention, a heating temperature of the thermal procedure is in a range of 100-140° C., and a heating time thereof is in a range of 1-2 hours.

In an embodiment of the invention, the liquid crystal polymerization initiator includes a thermal initiator.

In an embodiment of the invention, the thermal procedure includes a high-temperature heating procedure. After the high-temperature heating procedure, a portion of the liquid crystal molecules form a plurality of first polymer liquid crystal cells and a plurality of second polymer liquid crystal cells on the surfaces of the first substrate and the second substrate.

In an embodiment of the invention, an initial reaction temperature of the thermal initiator is 120° C. or more.

In an embodiment of the invention, a heating temperature of the high-temperature heating procedure is in a range of 120-160° C., and a heating time thereof is in a range of 1-3 hours.

In an embodiment of the invention, the thermal procedure includes a low-temperature heating procedure and a high-temperature heating procedure in sequence. After performing the low-temperature heating procedure and before performing the high-temperature heating procedure, a portion of the liquid crystal molecules form a plurality of first polymer liquid crystal cells and a plurality of second polymer liquid crystal cells on the surfaces of the first substrate and the second substrate.

In an embodiment of the invention, an initial reaction temperature of the thermal initiator is in a range of 40-80° C.

In an embodiment of the invention, a heating temperature of the low-temperature heating procedure is in a range of 40-80° C. and a heating time thereof is 5-10 minutes; and a heating temperature of the high-temperature heating procedure is in a range of 120-160° C. and a heating time thereof is in a range of 1-3 hours.

In an embodiment of the invention, the irradiation procedure includes an ultraviolet irradiation procedure.

In an embodiment of the invention, the polymerizable material makes up 20 wt % to 50 wt % by weight of the liquid crystal composition in the fabricating method of the transparent liquid crystal display.

In an embodiment of the invention, the polymerizable material further includes an acrylic resin monomer and a polythiol monomer.

In an embodiment of the invention, the polyether polyol acrylate monomer makes up 10 wt % to 30 wt %; the acrylic resin monomer makes up 10 wt % to 30 wt %; the polythiol monomer makes up 10 wt % to 30 wt %; and the liquid crystal polymerization initiator makes up 0.5 wt % to 5 wt % by weight of the polymerizable material in the fabricating method of the transparent liquid crystal display.

In an embodiment of the invention, the polyether polyol acrylate monomer includes:

In an embodiment of the invention, the acrylic resin monomer includes:

In an embodiment of the invention, the polythiol monomer includes:

In an embodiment of the invention, the photo-initiator includes:

Based on the above, the fabrication of the transparent liquid crystal display of the invention can be completed by injecting the liquid crystal composition between the substrates and applying the sealant curing procedures in the current assembly procedure. Therefore, the fabricating method of the invention has the advantages of high yield rate, low cost, and quick production.

DESCRIPTION OF THE EMBODIMENTS

Figure 1A:
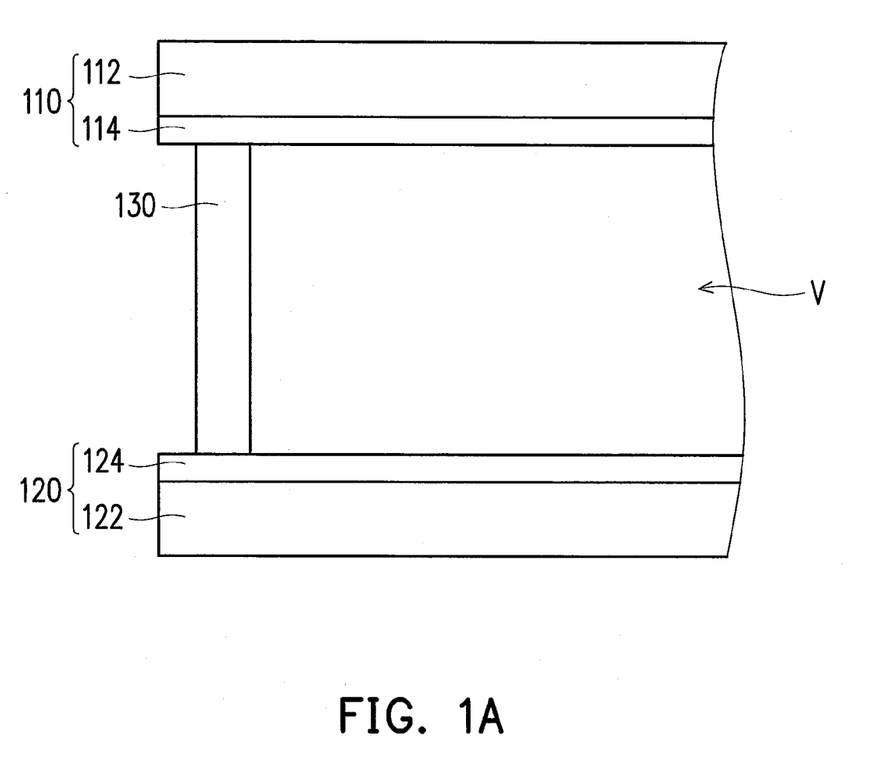
FIG. 1A to FIG. 1C are schematic cross-sectional views illustrating a fabricating method of a transparent liquid crystal display according to the first embodiment of the invention.
Figure 1B:
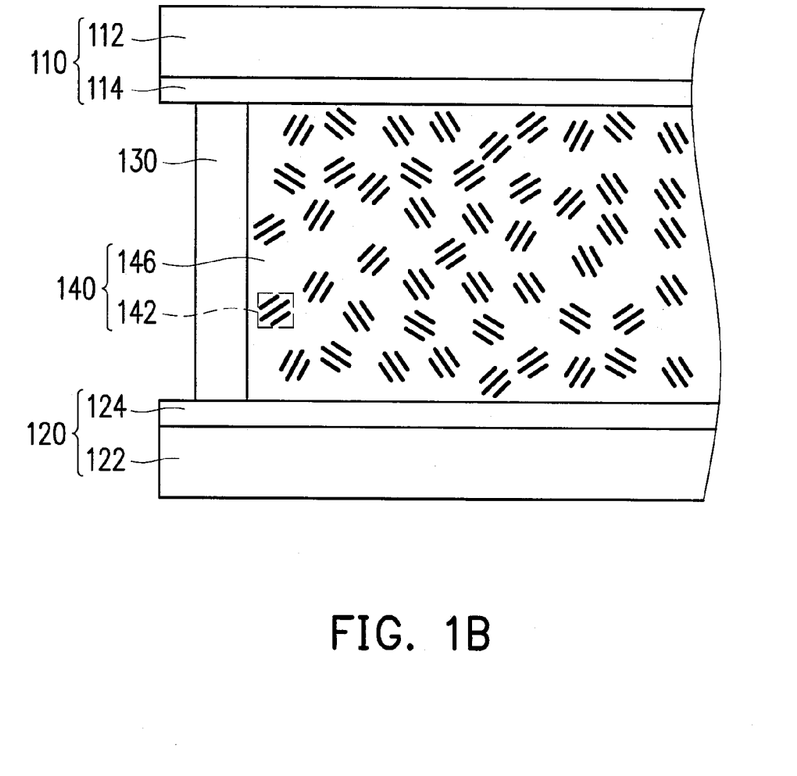
Figure 1C:
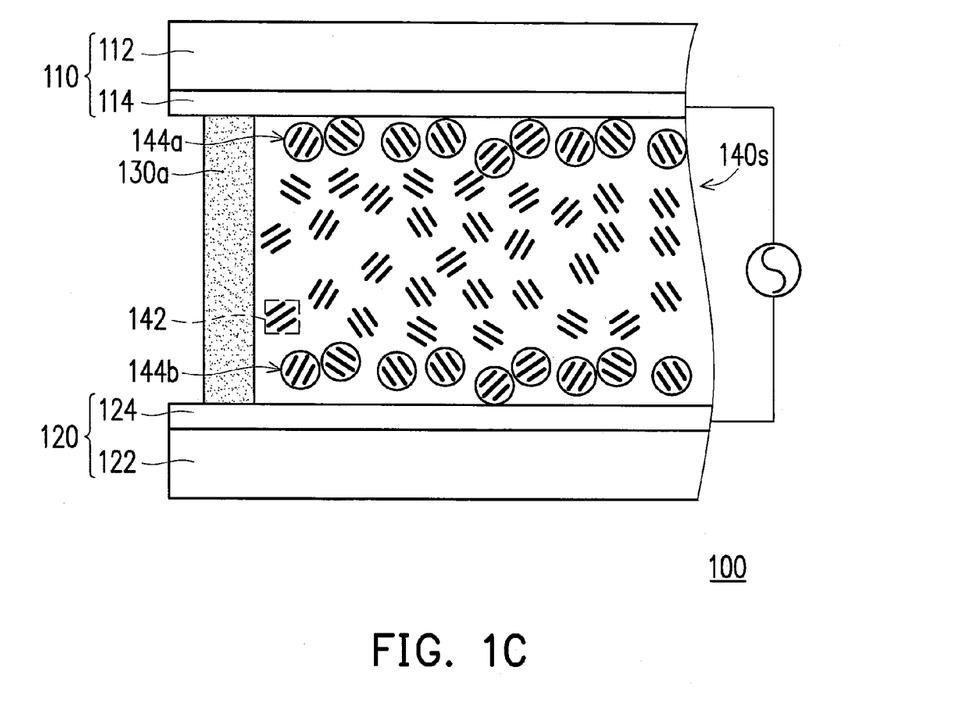
Figure 2:
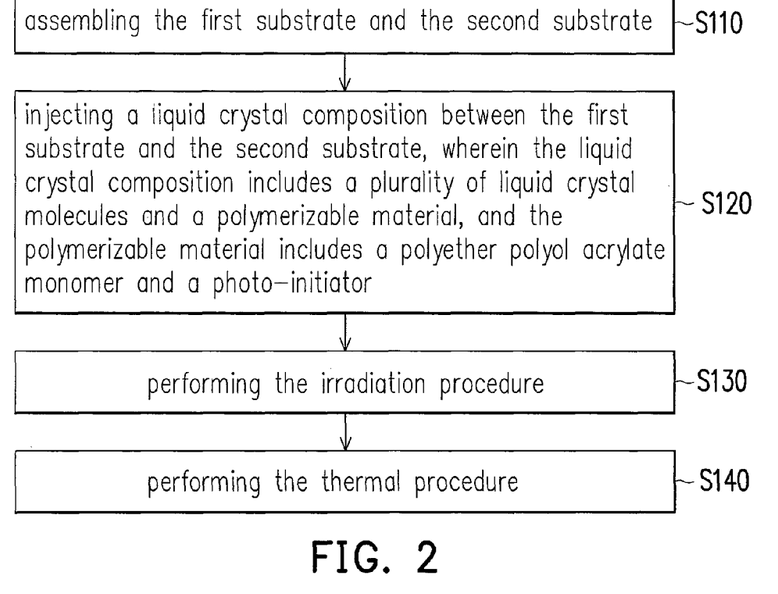
FIG. 2 is a flowchart showing the fabricating method of the transparent liquid crystal display according to the first embodiment of the invention.

FIG. 1A to FIG. 1C are schematic cross-sectional views illustrating a fabricating method of a transparent liquid crystal display according to the first embodiment of the invention. FIG. 2 is a flowchart showing the fabricating method of the transparent liquid crystal display according to the first embodiment of the invention. Referring to FIG. 1A and FIG. 2, Step S110 is performed first to assemble a first substrate 110 and a second substrate 120. A sealant 130 is applied between the first substrate 110 and the second substrate 120. In this embodiment, the first substrate 110 includes a base 112 and a pixel electrode 114 disposed on the base 112. In other embodiments, the first substrate 110 may further include a color filter (not shown) disposed between the base 112 and the pixel electrode 114. The second substrate 120 is disposed opposite to the first substrate 110. The second substrate 120 of this embodiment may be an active device array substrate. More specifically, the second substrate 120 includes a base 122, an active device (not shown) disposed on the base 122, and a pixel electrode 124 electrically connected with the active device.

The first substrate 110 and the second substrate 120 are adhered to each other by the sealant 130. Furthermore, the sealant 130 is applied on edges of the first substrate 110 and the second substrate 120. An accommodating space V exists between the first substrate 110, the second substrate 120, and the sealant 130.

Then, with reference to FIG. 1B and FIG. 2, Step S120 is performed. A liquid crystal composition 140 is injected into the accommodating space V shown in FIG. 1A. In this embodiment, the liquid crystal composition 140 may be filled between the first substrate 110 and the second substrate 120 by an ODF (One Drop Fill) method. However, the invention is not limited to the above. In other embodiments, the liquid crystal composition 140 is filled between the first substrate 110 and the second substrate 120 by a vacuum injection method or other suitable methods.

The liquid crystal composition 140 includes a plurality of liquid crystal molecules 142 and a polymerizable material 146. The polymerizable material 146 makes up 20 wt % to 50 wt % by weight of the liquid crystal composition 140. The polymerizable material 146 includes a polyether polyol acrylate monomer. The polyether polyol acrylate monomer makes up 10 wt % to 30 wt % by weight of the polymerizable material 146. Additionally, the polymerizable material 146 of this embodiment may further include a solvent, an acrylic resin monomer, a polythiol monomer, and a liquid crystal polymerization initiator. The acrylic resin monomer makes up 10 wt % to 30 wt %, the polythiol monomer makes up 10 wt % to 30 wt %, and the liquid crystal polymerization initiator makes up 0.5 wt % to 5 wt % by weight of the polymerizable material 146. The liquid crystal polymerization initiator used in the polymerizable material 146 of this embodiment is a photo-initiator, for example.

In this embodiment, a structure of the polyether polyol acrylate monomer is, for example, as follows:

In this embodiment, a structure of the acrylic resin monomer is, for example, as follows:

In this embodiment, a structure of the polythiol monomer is, for example, as follows:

In this embodiment, a structure of the photo-initiator is, for example, as follows:

Then, referring to FIG. 1B, FIG. 1C, and FIG. 2, Step S130 is performed. An irradiation procedure is executed to precure the sealant 130. The irradiation procedure is an ultraviolet irradiation procedure, for example, and the irradiation procedure is a precuring procedure for the sealant 130 in the current fabrication procedure. An accumulated light of the irradiation is 12 J or more, for example. Because the liquid crystal polymerization initiator used in the polymerizable material 146 of this embodiment is a photo-initiator, after the liquid crystal composition 140 is irradiated, the photo-initiator helps a portion of the liquid crystal molecules 142 and the polyether polyol acrylate monomer to generate a polymerization and form first polymer liquid crystal cells 144a and second polymer liquid crystal cells 144b respectively on the surfaces of the first substrate 110 and the second substrate 120.

To be more specific, the polyether polyol acrylate monomer has properties similar to a surfactant, which enables the liquid crystal molecules 142 to form the first polymer liquid crystal cells 144a and the second polymer liquid crystal cells 144b on the surfaces of the first substrate 110 and the second substrate 120. Moreover, the acrylic resin monomer further helps the liquid crystal molecules 142 in the polymer liquid crystal cells (144a, 144B) to generate the polymerization with the polyether polyol acrylate monomer, for example. Polythiol further enhances the adhesions between the surface of the first substrate 110 and the first polymer liquid crystal cells 144a and between the surface of the second substrate 120 and the second polymer liquid crystal cells 144b, such that the first polymer liquid crystal cells 144a and the second polymer liquid crystal cells 144b tend to disperse on the surfaces of the first substrate 110 and the second substrate 120, for example. The liquid crystal molecules 142 located between the first polymer liquid crystal cells 144a and the second polymer liquid crystal cells 144b are not easily polymerized and therefore remain in an unpolymerized state.

In the conventional irradiation procedure for precuring the sealant, a mask is usually used to shield the liquid crystal material, so as to prevent the properties of the liquid crystal material from changing due to exposure. By contrast, the irradiation procedure of this embodiment does not require a mask to shield the liquid crystal composition. Furthermore, the irradiation procedure is utilized to form the first polymer liquid crystal cells 144a and the second polymer liquid crystal cells 144b on the surfaces of the first substrate 110 and the second substrate 120. Therefore, the fabrication procedure is simplified and time-saving.

Next, Step S140 is carried out. A thermal procedure is executed to further cure the sealant 130 into a sealant 130a. The thermal procedure is a roasting procedure, for example, for precuring the sealant 130 in the current fabrication procedure. A heating temperature of the thermal procedure is in a range of 120-160° C. and a heating time thereof is in a range of 1-3 hours. In another embodiment of the invention, the heating temperature of the thermal procedure is 120° C. and the heating time thereof is 1.5 hours. The thermal procedure completely cures the precured sealant 130 into the sealant 130a, so as to adhere the first substrate 110 and the second substrate 120 to each other. Moreover, if there is any monomer (including polyether polyol acrylate monomer, acrylic resin monomer, and polythiol monomer) that is not completely polymerized in the aforementioned irradiation procedure, the thermal procedure further eliminates the unpolymerized monomer, so as to ensure that the reactivity of the unpolymerized monomer is terminated. After the thermal procedure, a transparent liquid crystal display 100 is obtained, as shown in FIG. 1C.

Referring to FIG. 1C, when a potential difference exists between the first substrate 110 and the second substrate 120, the optical axis directions of the first polymer liquid crystal cells 144a on the surface of the first substrate 110, the second polymer liquid crystal cells 144b on the surface of the second substrate 120, and the liquid crystal molecules 142 are substantially consistent to one another. Accordingly, when an incident light is transmitted to the transparent liquid crystal display 100, the incident light passes through the second substrate 120, a liquid crystal layer 140s, and the first substrate 110 to turn a partial area of the transparent liquid crystal display 100 into a transparent state.

In addition, when the potential difference between the first substrate 110 and the second substrate 120 is substantially 0, the optical axis directions of the first polymer liquid crystal cells 144a on the surface of the first substrate 110, the second polymer liquid crystal cells 144b on the surface of the second substrate 120, and the liquid crystal molecules 142 substantially intersect one another. Accordingly, when the incident light is transmitted to the transparent liquid crystal display 100, the incident light is scattered by the second polymer liquid crystal cells 144b, and as a result, the partial area of the transparent liquid crystal display 100 shows a scatter state. By making the partial areas of the transparent liquid crystal display 100 show the transparent state and the scatter state respectively, as described above, the transparent liquid crystal display 100 displays images without using a polarizer. Therefore, the fabricating method of the transparent liquid crystal display 100 according to this embodiment has the advantage of low production cost.

Figure 3:
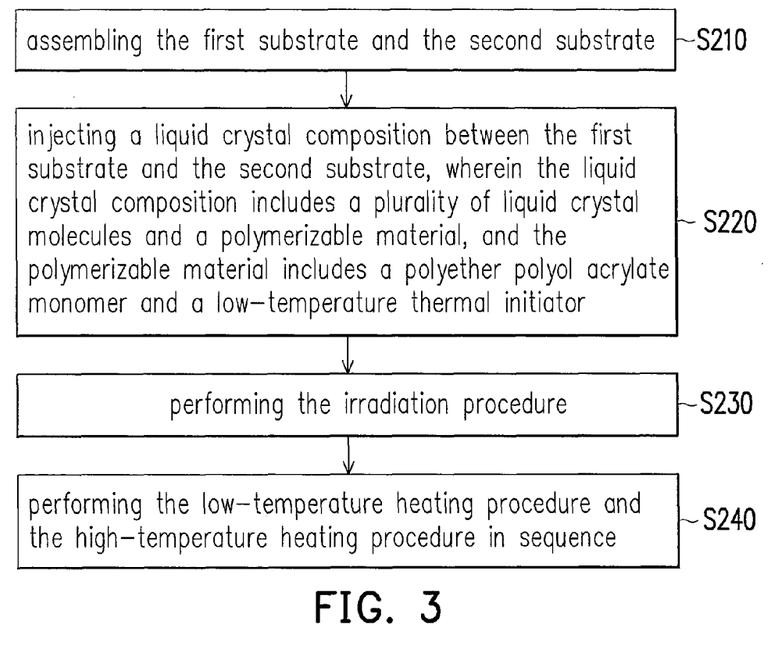
FIG. 3 is a flowchart showing a fabricating method of a transparent liquid crystal display according to the second embodiment of the invention.

FIG. 3 is a flowchart showing a fabricating method of a transparent liquid crystal display according to the second embodiment of the invention. A fabrication procedure of the second embodiment is approximately the same as the fabrication procedure of the first embodiment. Thus, please refer to the first embodiment for details of the structure of the transparent liquid crystal display and the identical steps. The difference will be explained in the following paragraphs.

With reference to FIG. 3 and FIG. 1C, first Step S210 and Step S220 are performed. Steps S210 and S220 are approximately the same as Steps S110 and S120 of the first embodiment. A difference between the second embodiment and the first embodiment is that, in the second embodiment, the liquid crystal polymerization initiator used in the polymerizable material is a thermal initiator.

Then, Step S230 is performed to carry out the irradiation procedure. Because the thermal initiator is used as the liquid crystal polymerization initiator for the polymerizable material 146 in this embodiment, the liquid crystal molecules 142 do not generate the polymerization easily in the irradiation procedure that precures the sealant 130. It goes without saying that a mask may also be used in the irradiation procedure to shield the liquid crystal composition 140 to prevent the polymerization generated by the liquid crystal molecules 142.

Next, Step S240 is carried out. The thermal procedure is performed. The thermal procedure of this embodiment includes a low-temperature heating procedure and a high-temperature heating procedure. A heating temperature of the low-temperature heating procedure is in a range of 40-80° C. and a heating time thereof is in a range of 5-10 minutes, for example. After the low-temperature heating procedure, a portion of the liquid crystal molecules 142 form a plurality of first polymer liquid crystal cells 144a and a plurality of second polymer liquid crystal cells 144b respectively on the surfaces of the first substrate 110 and the second substrate 120.

More specifically, the liquid crystal polymerization initiator used in this embodiment is a low-temperature thermal initiator and a reaction temperature of the low-temperature thermal initiator is 40-80° C. Thus, after the liquid crystal composition 140 is heated, the low-temperature thermal initiator helps a portion of the liquid crystal molecules 142 and the polyether polyol acrylate monomer to generate the polymerization and form the first polymer liquid crystal cells 144a and the second polymer liquid crystal cells 144b respectively on the surfaces of the first substrate 110 and the second substrate 120. For mechanism of the polymerization of the liquid crystal composition 140, please refer to the first embodiment.

The low-temperature thermal initiator used in this embodiment is an amines compound with reaction temperature of 40-80° C. The low-temperature thermal initiator may be PN-23 or PN-31J thermal initiator produced by SEAEN SPECIAL MATERIAL CO., LTD. Beyond all question, the invention is not limited thereto. Any suitable thermal initiator with reaction temperature of 40-80° C. may be used as the low-temperature thermal initiator.

Thereafter, the high-temperature heating procedure is performed. The high-temperature heating procedure is a roasting procedure, for example, for the sealant 130 in the current fabrication procedure. A heating temperature of the high-temperature heating procedure is in a range of 120-160° C. and a heating time thereof is in a range of 1-3 hours. In another embodiment of the invention, the heating temperature of the high-temperature heating procedure is 120° C. and the heating time is 1.5 hours. The high-temperature heating procedure completely cures the sealant 130a, so as to adhere the first substrate 110 and the second substrate 120 to each other. In addition, if there is any monomer that is not completely polymerized in the aforementioned low-temperature heating procedure, the high-temperature heating procedure further eliminates the unpolymerized monomer, so as to ensure that the reactivity of the unpolymerized monomer is terminated.

Figure 4:
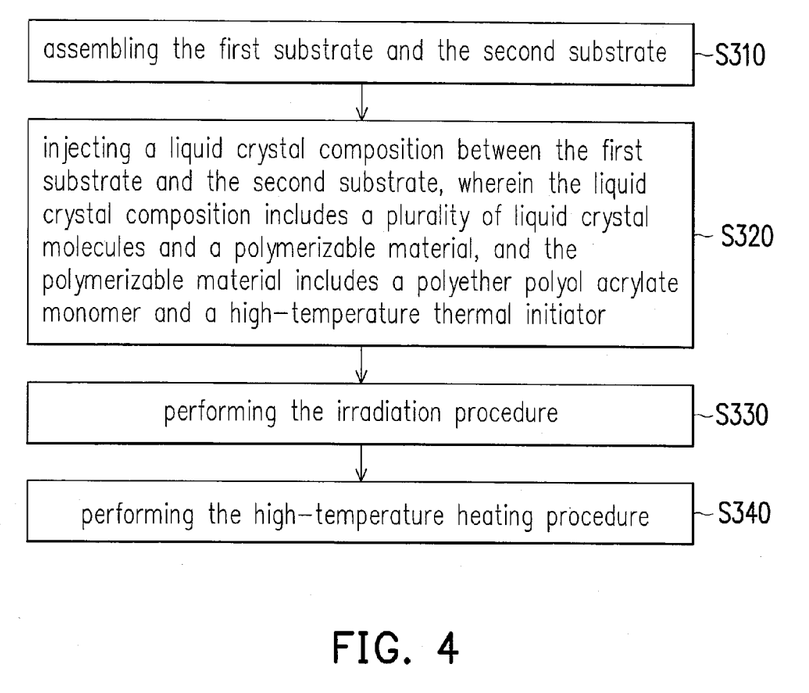
FIG. 4 is a flowchart showing a fabricating method of a transparent liquid crystal display according to the third embodiment of the invention.

FIG. 4 is a flowchart showing a fabricating method of a transparent liquid crystal display according to the third embodiment of the invention. A fabrication procedure of the third embodiment is approximately the same as the fabrication procedure of the first embodiment. Thus, please refer to the first embodiment for details of the structure of the transparent liquid crystal display and the identical steps. The difference will be explained in the following paragraphs.

With reference to FIG. 4 and FIG. 1C, first Step S310 and Step S320 are performed. Steps S310 and S320 are approximately the same as Steps S110 and S120 of the first embodiment. A difference between the third embodiment and the first embodiment is that, in the third embodiment, the liquid crystal polymerization initiator used in the polymerizable material is a thermal initiator.

Then, Step S330 is performed to carry out the irradiation procedure. Because the thermal initiator is used as the liquid crystal polymerization initiator for the polymerizable material 146 in this embodiment, the liquid crystal molecules 142 do not generate the polymerization easily in the irradiation procedure that precures the sealant 130. It goes without saying that a mask may also be used in the irradiation procedure to shield the liquid crystal composition 140 to prevent the polymerization generated by the liquid crystal molecules 142.

Then, Step S340 is performed to carry out the thermal procedure. The thermal procedure is a high-temperature heating procedure, for example. The high-temperature heating procedure is a roasting procedure, for example, for the sealant 130 in the current fabrication procedure. A heating temperature of the high-temperature heating procedure is in a range of 120-160° C. and a heating time thereof is in a range of 1-3 hours. In another embodiment of the invention, the heating temperature of the high-temperature heating procedure is 120° C. and the heating time thereof is 1.5 hours. After the high-temperature heating procedure, a portion of the liquid crystal molecules 142 form a plurality of first polymer liquid crystal cells 144a and a plurality of second polymer liquid crystal cells 144b respectively on the surfaces of the first substrate 110 and the second substrate 120.

More specifically, the liquid crystal polymerization initiator used for the polymerizable material 146 in this embodiment is a high-temperature thermal initiator and a reaction temperature of the high-temperature thermal initiator is 120° C. or more. Therefore, after the liquid crystal composition 140 is heated, the thermal initiator helps a portion of the liquid crystal molecules 142 and the polyether polyol acrylate monomer to generate the polymerization and form the first polymer liquid crystal cells 144a and the second polymer liquid crystal cells 144b respectively on the surfaces of the first substrate 110 and the second substrate 120. For mechanism of the polymerization of the liquid crystal composition 140, please refer to the first embodiment. Furthermore, the thermal procedure cures the sealant 130a to adhere the first substrate 110 and the second substrate 120 to each other and then obtain the transparent liquid crystal display.

The high-temperature thermal initiator used in this embodiment is an amines compound with reaction temperature of 120° C. or more. The high-temperature thermal initiator may be AH-154 or AH-162 thermal initiator produced by SEAEN SPECIAL MATERIAL CO., LTD. Beyond all question, the invention is not limited thereto. Any suitable thermal initiator with reaction temperature of 120° C. or more may be used as the high-temperature thermal initiator.

Based on the above, the fabricating method of the transparent liquid crystal display according to the invention does not require the procedure of coating an alignment film. Besides, there is no need to additionally apply a voltage in combination with the irradiation procedure to form a polymer having alignment properties. In other words, the fabrication of the transparent liquid crystal display of the invention can be completed by injecting the liquid crystal composition between the substrates and applying the sealant curing procedures in the current assembly procedure. Therefore, the fabricating method of the invention has the advantages of high yield rate, low cost, and quick production.

What is claimed is:

1. A fabricating method of a transparent liquid crystal display, the fabricating method comprising:
   assembling a first substrate and a second substrate, and applying a sealant between the first substrate and the second substrate, wherein an accommodating space exists between the first substrate, the second substrate and the sealant;
   injecting a liquid crystal composition into the accommodating space, wherein the liquid crystal composition comprises a plurality of liquid crystal molecules and a polymerizable material, and the polymerizable material comprises a polyether polyol acrylate monomer and a liquid crystal polymerization initiator; and
   performing an irradiation procedure and performing a thermal procedure so as to cure the sealant, wherein during the curing of the sealant, a portion of the liquid crystal composition forms a plurality of first polymer liquid crystal cells and a plurality of second polymer liquid crystal cells respectively on a surface of the first substrate and a surface of the second substrate,
   wherein the liquid crystal polymerization initiator comprises a thermal initiator,
   wherein the thermal procedure comprises performing a low-temperature heating procedure and a high-temperature heating procedure in sequence, and the plurality of first polymer liquid crystal cells and the plurality of second polymer liquid crystal cells are formed after the low-temperature heating procedure is performed and before the high-temperature heating procedure is performed.

2. The fabricating method of the transparent liquid crystal display according to claim 1, wherein the initial reaction temperature of the thermal initiator is in a range of 40-80° C.

3. The fabricating method of the transparent liquid crystal display according to claim 1, wherein:
   a heating temperature of the low-temperature heating procedure is in a range of 40-80° C. and a heating time thereof is in a range of 5-10 minutes; and
   the heating temperature of the high-temperature heating procedure is in a range of 120-160° C. and the heating time thereof is in a range of 1-3 hours.

4. The fabricating method of the transparent liquid crystal display according to claim 1, wherein the irradiation procedure comprises an ultraviolet irradiation procedure.

5. The fabricating method of the transparent liquid crystal display according to claim 1, wherein the polymerizable material makes up 20 wt % to 50 wt % by weight of the liquid crystal composition.

6. The fabricating method of the transparent liquid crystal display according to claim 1, wherein the polymerizable material further comprises an acrylic resin monomer and a polythiol monomer.

7. The fabricating method of the transparent liquid crystal display according to claim 6, wherein the polyether polyol acrylate monomer makes up 10 wt % to 30 wt %; the acrylic resin monomer makes up 10 wt % to 30 wt %; the polythiol monomer makes up 10 wt % to 30 wt %; and the liquid crystal polymerization initiator makes up 0.5 wt % to 5 wt % by weight of the polymerizable material.

* * * * *